(12) United States Patent
Shin et al.

(10) Patent No.: US 10,642,983 B2
(45) Date of Patent: May 5, 2020

(54) METHOD AND APPARATUS FOR PROTECTING APPLICATION

(71) Applicants: SAMSUNG ELECTRONICS CO., LTD., Suwon-si, Gyeonggi-do (KR); SEOUL NATIONAL UNIVERSITY R&DB FOUNDATION, Seoul (KR)

(72) Inventors: Jun-Bum Shin, Suwon-si (KR); Yun-Heung Paek, Seoul (KR); Myung-Joo Ham, Seoul (KR); Yeong-Pil Cho, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 245 days.

(21) Appl. No.: 15/549,775

(22) PCT Filed: Mar. 16, 2016

(86) PCT No.: PCT/KR2016/002605
§ 371 (c)(1),
(2) Date: Aug. 9, 2017

(87) PCT Pub. No.: WO2016/148491
PCT Pub. Date: Sep. 22, 2016

(65) Prior Publication Data
US 2018/0018461 A1    Jan. 18, 2018

(30) Foreign Application Priority Data
Mar. 18, 2015    (KR) ........................ 10-2015-0037780

(51) Int. Cl.
*H04L 29/00*    (2006.01)
*G06F 21/57*    (2013.01)
(Continued)

(52) U.S. Cl.
CPC .......... *G06F 21/575* (2013.01); *G06F 9/4406* (2013.01); *G06F 21/53* (2013.01);
(Continued)

(58) Field of Classification Search
CPC ... H04L 65/1083; H04L 67/104; H04L 67/14; H04L 69/24; H04L 69/328
See application file for complete search history.

(56) References Cited

U.S. PATENT DOCUMENTS

2003/0200402 A1    10/2003    Willman et al.
2010/0049975 A1    2/2010    Parno et al.
(Continued)

FOREIGN PATENT DOCUMENTS

KR    10-1317496    11/2013
KR    10-2014-0044972    4/2014

OTHER PUBLICATIONS

International Search Report for PCT/KR2016/002605 dated Jun. 29, 2016, 4 pages.
(Continued)

*Primary Examiner* — Ghazal B Shehni
(74) *Attorney, Agent, or Firm* — Nixon & Vanderhye, P.C.

(57) ABSTRACT

The present invention relates to a method for protecting content of an electronic device, comprising the steps of: enabling a first security module to transmit a data encryption request to a second security module when data requiring security is generated according to the execution of a security application by the first security module in a security storage region of a memory; enabling the second security module to generate an encryption key by using the authentication information included in the data encryption request and to encrypt the data included in the data encryption request by using the encryption key; enabling the second security (Continued)

module to transfer the encrypted data to the first security module; and enabling the first security module to store the encrypted data in the security application.

14 Claims, 8 Drawing Sheets

(51) Int. Cl.
*H04L 9/08* (2006.01)
*G06F 21/53* (2013.01)
*G06F 9/4401* (2018.01)
*G06F 21/60* (2013.01)
*H04L 9/14* (2006.01)
*H04L 9/32* (2006.01)

(52) U.S. Cl.
CPC .......... *G06F 21/602* (2013.01); *H04L 9/0861* (2013.01); *H04L 9/0866* (2013.01); *H04L 9/14* (2013.01); *H04L 9/3226* (2013.01)

(56) References Cited

U.S. PATENT DOCUMENTS

| | | |
|---|---|---|
| 2011/0314284 A1 | 12/2011 | Chou |
| 2013/0031374 A1 | 1/2013 | Thom et al. |
| 2013/0159729 A1 | 6/2013 | Thom et al. |
| 2014/0053245 A1 | 2/2014 | Tosa et al. |
| 2014/0082690 A1 | 3/2014 | Ju et al. |
| 2014/0282501 A1 | 9/2014 | Zeng et al. |
| 2014/0282543 A1* | 9/2014 | Ignatchenko ....... G06F 9/45558 718/1 |
| 2014/0337918 A1 | 11/2014 | Siddiqi et al. |

OTHER PUBLICATIONS

Written Opinion of the ISA for PCT/KR2016/002605 dated Jun. 29, 2016, 6 pages.

J. M. McCune et al., "TrustVisor: Efficient TCB Reduction and Attestation", *CyLab at Carnegie Mellon,* Mar. 9, 2009, 17 pages.

* cited by examiner

METHOD AND APPARATUS FOR PROTECTING APPLICATION

This application is a National Phase Entry of PCT International Application No. PCT/KR2016/002605, which was filed on Mar. 16, 2016, and claims a priority to Korean Patent Application No. 10-2015-0037780, which was filed on Mar. 18, 2015, the contents of which are incorporated herein by reference.

TECHNICAL FIELD

The present disclosure relates to an electronic device, and more particularly, to a method and device for securely protecting an application stored in the electronic device.

BACKGROUND ART

Recently, the mobile device is required to handle a high quality of service. For example, a mobile device may download various applications from the Internet or a mobile communication network and install the applications on the mobile device, and accordingly provide services provided by each application. Applications are, for example, a game application, a Social Networking Service (SNS) based application, a banking application, an image editing application, a map application, etc.

In order to provide such a variety of services, the mobile device employs a Central Process Unit (CPU) and an operating system (OS). The mobile device employs an open operating system (open OS) in order to implement an open application program interface. The open operating system has become the core of competition for mobile devices and mobile services. In addition, the operating system of the mobile device is strategically opened by a major manufacturer and a major provider, and an application program interface, a software development kit, and a source file are to be open to the public.

While applications downloaded from the Internet by the mobile device may be used after receiving a quality inspection and approval from the manufacturer of the mobile device, substantially all of the functions of various applications cannot be tested. Accordingly, there is a problem in that malware targeting such mobile devices increases, and in particular, mobile devices using open operating systems may receive software attacks by malware. Recently, methods for using secure operating systems are being sought.

A method for using a secure operating system may include, for example, a hypervisor-based security method. The hypervisor-based security method divides a storage area of a memory into a non-secure storage area and a secure storage area, an application that requires security (hereinafter referred to as "a security application") provides an execution environment for operating in a secure storage area. That is, when booting a mobile device, the hypervisor divides the storage area of the memory into a non-secure storage area and a secure storage area such that a general application that does not require security operates in a non-secure storage, and a security application operates in a secure storage area.

In another method, there is a trust zone based security method. The trust zone based security method is a method for protecting a security application in a hardware level, which enables a secure world and a normal world to exist in a single application controller (for example, a CPU, an ARM, etc.) without using a separate secure hardware chip, to provide an execution environment in which a general application operates in a normal world and an application that require security operates in a secure world.

DISCLOSURE

Technical Problem

The hypervisor-based security method has a problem of performance degradation when a security function is not used.

In addition, the trust zone based security method has a problem that it is difficult to protect the new security application because of the complexity of an authentication process for a new security application other than a security application authenticated while manufacturing the mobile device.

Technical Solution

The present disclosure has been made to solve the above-mentioned problems, and an aspect of the present disclosure is to provide a method and device for strongly protecting an application from malware attacks.

Further, the present disclosure provides a method and device for protecting an application which can protect various security applications.

Furthermore, the present disclosure is characterized by deactivating a hypervisor while the security application is not running and activating the hypervisor only while the security application is running, in order to prevent the performance degradation due to the hypervisor.

Furthermore, the present disclosure is to provide a method and device for protecting an application which can prevent an execution of a security application from being delayed.

Meanwhile, the present disclosure relates to a method for protecting an application of an electronic device. The method may include: transmitting, by a first security module, a request for encrypting data to a second security module when security-required data is generated according to a security application being executed by the first security module in a security storage area of a memory; generating, by the second security module, an encryption key using authentication information included in the data encryption request, and encrypting the data included in the data request using the encryption key; transmitting the encrypted data to the first security module by the second security; and storing the encrypted data in the security application by the first security module.

On the other hand, in accordance with an embodiment of the present disclosure relates to an electronic device. The electronic device may comprise: a memory; and a controller, wherein the controller includes: a first security module that executes a security application in a security storage of the memory, and transmits a data encryption request to a second security module when security-required data is generated according to the execution of the secure application; and the second security module that generates an encryption key using authentication information included in the data encryption request, encrypts the data included in the data encryption request using the encryption key, and transfers the encrypted data to the first security module so that the first security module may store the encrypted data in the security application.

Advantageous Effects

The present disclosure may strongly protect an application from malware attacks by providing a double security module. In addition, the present disclosure may protect various security applications to be newly added to the mobile device. In addition, the present disclosure may prevent the execution delay of a security application.

DESCRIPTION OF DRAWINGS

The above and other aspects, features, and advantages of the present disclosure will be more apparent from the following detailed description taken in conjunction with the accompanying drawings, in which.

MODE FOR INVENTION

Figure 1:
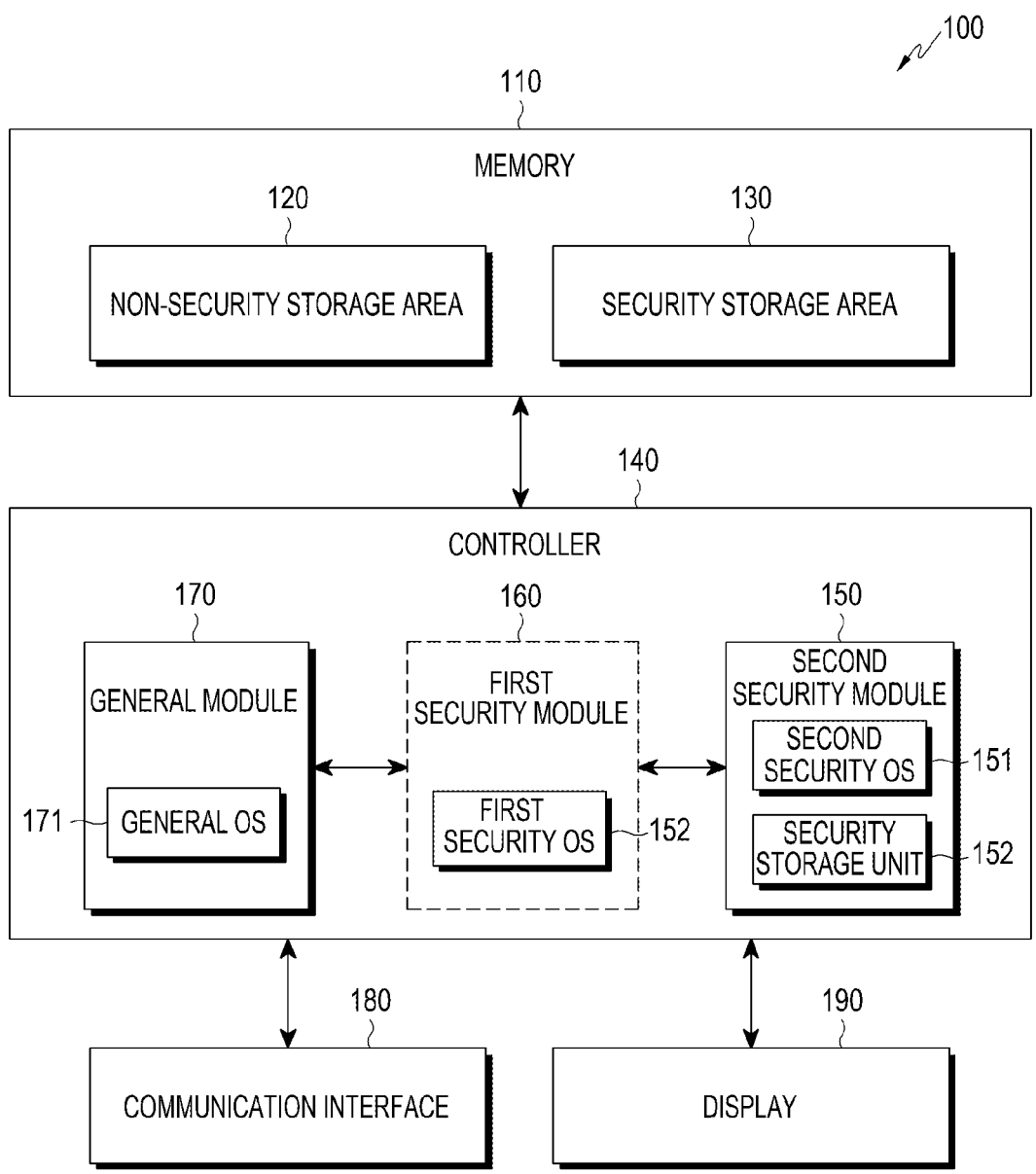
FIG. 1 is a diagram showing a configuration of an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

A configuration of an electronic device according to an embodiment of the present disclosure is shown in FIG. 1. FIG. 1 is a diagram showing a configuration of an electronic device according to an embodiment of the present disclosure.

Referring to FIG. 1, an electronic device 100 may include a memory 110, a controller 140, a communication interface 180, and a display 190.

Examples of the display 190 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 190, for example, may display various types of contents (for example, text, images, videos, icons, or symbols) for the user. The display 190 may include a touch screen and receive, for example, a touch, gesture, proximity, or hovering input by using an electronic pen or the user's body part.

The communication interface 180 may establish communication between the electronic device 100 and an external device. For example, the communication interface 180 may communicate with the external device by connecting to a network via wireless communication or wired communication.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short range communication. The short-range communication may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network, for example, a computer network (for example, a LAN or a WAN), the Internet, and a telephone network.

The memory 110 may store, for example, instructions or data relevant to at least one other element of the electronic device 100. According to an embodiment, the memory 110 may store a digital content.

The digital content corresponds to digital data that can be stored in the memory 110 or installed in the electronic device 100, and may include, for example, various types of information, various application programs (hereinafter referred to as 'applications'), multimedia data, etc. The multimedia data may include, for example, text data, image data, video data, and audio data. The application may be divided into a security application (SCF: Security Critical Function) and a non-security application. The security application corresponds to an application to which an access right is limited, or an application to be protected from hacking or malware, and information or a code indicating the security application may be included in the application. The security application may include various banking application, applications that use personal information (for example, an SNS-based application, a contact management application, an image storage application, a video storage application), and the like.

According to one embodiment, a storage area of the memory 110 may include a non-secure storage area 120 and a secure storage area 130. A non-security application and information needed to execute the non-security application may be stored in the non-secure storage area 120. Further, the non-secure storage area 120 may operate as a working memory for executing the non-security application. A security application accessible by only a security module and information needed to run the security application may be stored in the secure storage area 130, and the secure storage area 130 may operate as a working memory for running the security application. The secure storage area 130 may store a list of security applications, and the list of security applications may include authentication information on each security application. Further, the size of the secure storage area 120 and the location in the memory 110 may be dynamically changed by the first security module 160 of the controller 140.

The controller 140 may include a general-purpose processor (for example, a CPU or an application controller (an application processor) or a communication controller (a communication processor), a ROM having stored therein a control program for controlling the device 100, and a RAM having stored therein a signal or data input from the outside of the device 100 or being used as a storage area for the operation to be performed on the device 100, or the like. The general-purpose CPU 111 may include a single core, a dual core, a triple core, or a quad core.

In accordance with one embodiment, the controller 140 may include a main module 170 for performing a non-secure execution for a non-secure process or a non-security application using a single general-purpose processor, and a plurality of security modules, that is, a first security module 160 and a second security module 150 for performing a secure execution for a security process or a security application.

In the general module 170, a normal operating system 171 may be executed, and in each of the plurality of security modules 150 and 160, separate secure operating systems 151 and 161 are executed. In other words, a second secure operating system 151 may be executed in the second security module 150, and the first secure operating system 161 may be executed in the first security module 160. A memory area used by the secure operating systems 151 and 161 corresponds to the secure storage area 130 and an access by the general operating system 171 is cut off. Accordingly, even when the general operating system 171 is an open type operating system, malware may not access the secure operating systems 151 and 161, or the memory area used by the secure operating systems 151 and 161.

The general module 170 may perform a non-security process related to an operation of the electronic device 100, or perform a non-security application. Further, when there is a request for executing the security process or the security application, the general module 170 may notify of the request to the first security module 160.

The first security module 160 may perform a security process related to the operation of the electronic device 100, or control of storing, installation, execution, or update of the security application, in the secure storage area 130. As a result, a security application can be primarily protected from malware, etc.

In addition, the first security module 160 may request the second security module 150 for the encryption of the data when security-required data is generated during the execution of a security application. Upon requesting the encryption of the data, the first security module 160 transmits authentication information of the security application along with the data to the second security module 150. Authentication information to be used when generating the encryption key may be identification information on a developer of the security application and identification information on the security application. Accordingly, the second security module 150 may generate an encryption key using the authentication information, encrypt the data using the generated encryption key, and transmit the encrypted data to the first security module 160. The first security module 160 may store the encrypted data in the security application. As a result, main data of the security application may be secondarily protected.

The first security module 160 may request the second security module 150 for the decryption of the encrypted data when the encrypted data should be used according to the security application being executed. Upon requesting the encryption of the data, the first security module 160 transmits authentication information of the security application along with the encrypted data to the second security module 150. Accordingly, the second security module 150 may generate an encryption key using the authentication information, decrypt the data using the generated encryption key, and transmit the decrypted data to the first security module 160.

When booting or executing the security application, the first security module 160 may set to extend the storage area 130 of the memory 110. The first security module 160 is activated only when the secure content is executed, and deactivated when the execution of the security content is interrupted or terminated. Before deactivation, the first security module 160 may request the second security module 150 to protect the secure storage area 130. Accordingly, since the second security module 150 may set a secure storage area 130 into a protection area, the general module 170 may not access to the secure storage area 130 even when the first security module 160 is in a state of deactivation. In addition, even when the first security module 160 is in the deactivation state, by having setting data for loading the first secure operating system 161 of the first security module 160 retained on the secure storage area 130, activation/deactivation switching speed of the first security module 160 can be improved.

The first security module 160 may communicate with the second security module 150 by forming a secure channel, and a secure channel encryption key for forming the secure channel may be shared between the second security module 150 and the first security module 160 during the boot process of the electronic device 100.

When a new security application is downloaded, the first security module 160 may extract authentication information from the new security application, and store the authentication information in the security application list of the secure storage area 130, thereby registering a new security application to the security application list. When registration of security application is completed, the first security module 160 may store or install the new security application in the secure storage area 130. Authentication information used upon registration of the security application may include a digital signature of the security application, developer identification information, security application identification information, and version information. Authentication information stored in the security application list can be used as information for authenticating the security application when executing the security application.

The second security module 150 may protect the first security module 160 by preventing hackers from gaining access to the first secure operating system 161 of the first security module 160. When the electronic device 100 is powered on, the second security module 150 is booted before the general module 170 and the first security module 160 are booted. Upon completing the boot, the second security module checks the integrity of the first secure operating system 161 of the first security module 160, and if there is no error, commands to boot the first security module 160.

In addition, the second security module 150 may include a secure storage unit 152. The secure storage unit 152 stores information to be used when checking the integrity of the first secure operating system 161 of the first security module 160, and an algorithm for generating the secure channel encryption key used to form the secure channel between the second security module 150 and the first security module 160. In addition, the secure storage unit 152 stores an algorithm for encryption and decryption of the data generated or used during execution of the secure content by the first security module 160.

Figure 2:
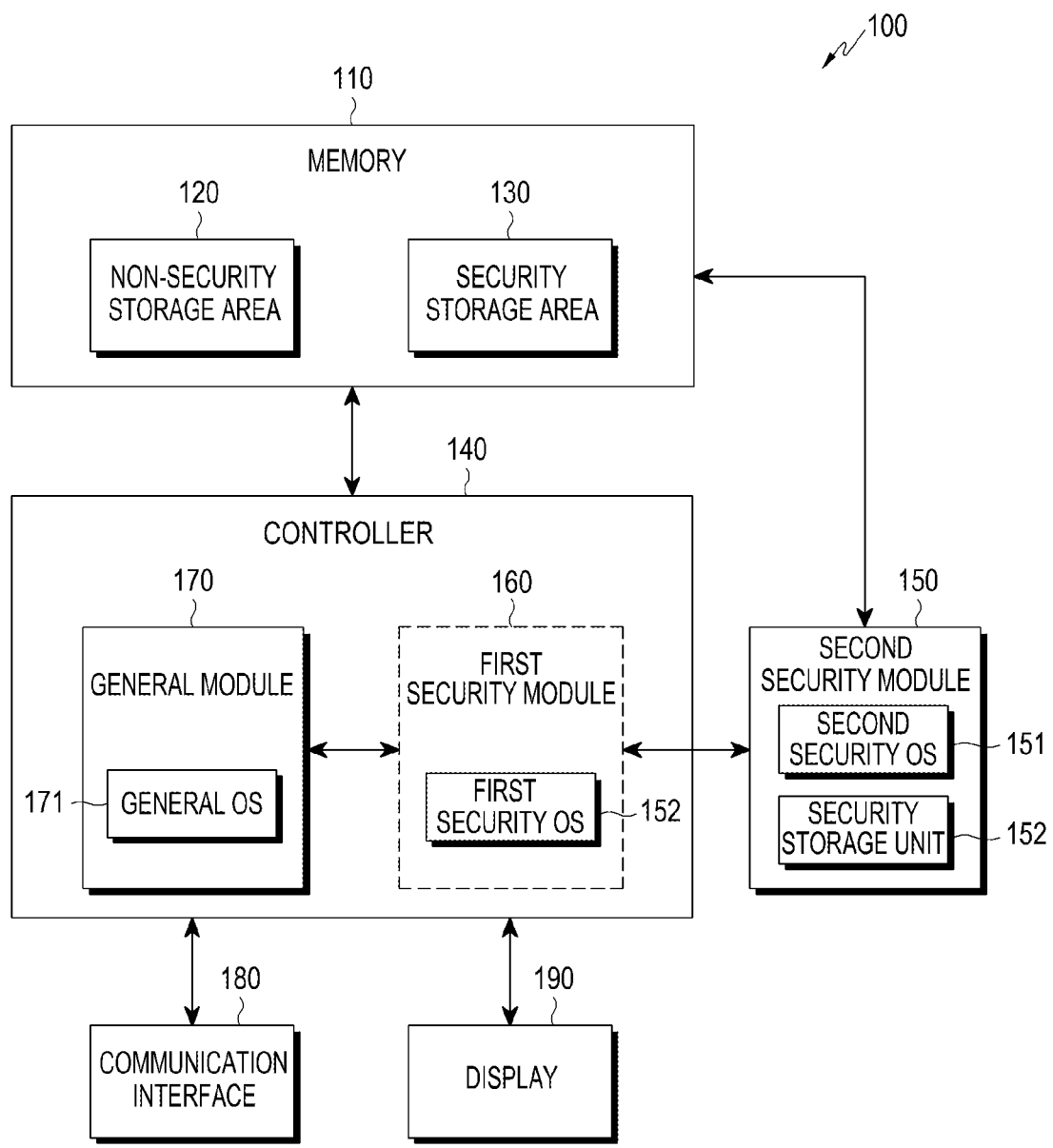
FIG. 2 is a diagram showing a configuration of an electronic device according to another embodiment of the present disclosure.

In an embodiment of FIG. 1, it was assumed that the second security module 150 is included in the controller 140, but according to an embodiment of the present disclosure, the second security module 150 may be implemented as a hardware device separated from the controller 140. This is shown in FIG. 2. FIG. 2 is a diagram showing a configuration of an electronic device 100 according to another embodiment of the present disclosure. As shown in FIG. 2, although the second security module 150 is implemented as a separate hardware device, an operation of the second security module 150 will be similar to the embodiment of FIG. 1, and the electronic device 100 according to an embodiment of FIG. 2 may perform operation processes shown in FIGS. 3 to 6.

Figure 3:
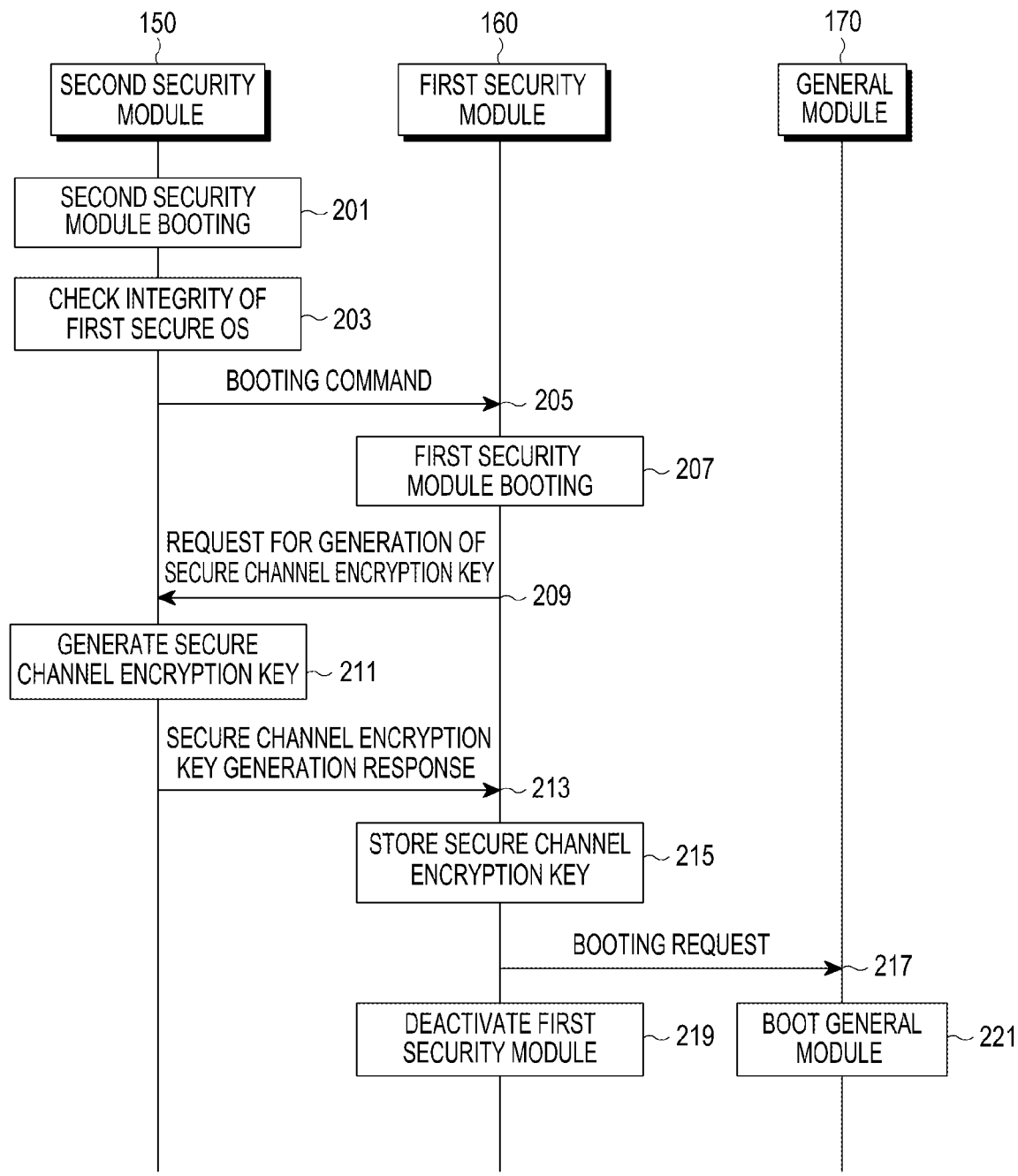
FIG. 3 is a diagram showing a boot process of an electronic device according to an embodiment of the present disclosure.

FIG. 3 is a diagram showing a boot process of an electronic device 100 according to an embodiment of the present disclosure. Referring to FIG. 3, when the electronic device 100 is powered-on, the second security module 150 performs booting in step 201, and when the boot is completed, the second security module 150 may check the integrity of the first secure operating system 161 of the first security module 160. As a result of the check, if there is no error, the second security module 150 may transfer the boot command to the first security module 160 in step 205. Accordingly, the second security module 150 may prevent hacking or malware attacks on the first security module 160.

The first security module 160 starts booting according to a boot command in step 207, and when the boot is completed, requests the second security module 150 to generate the secure channel encryption key to be used for forming a secure channel, in step 209.

The first security module 160, according to the encryption key generation request, may generate and store the secure channel encryption key using the secure channel encryption key generation algorithm stored in the secure storage unit 152, in step 211. Further, the second security module 150 transmits a secure channel encryption key generation response including the secure channel encryption key to the first security module 160, in step 213. The first security module 160 may store the secure channel encryption key in step 215. As described above, the second security module 150 and the first security module 160 may share the secure channel encryption key during the boot process, and perform communication by establishing the secure channel to strengthen the security. The first security module 160 deactivates the first security module 219, in step 219.

The first security module 160 may request the general module 170 to boot, in step 217, and the general module 170 may perform a booting in step 221.

Figure 4:
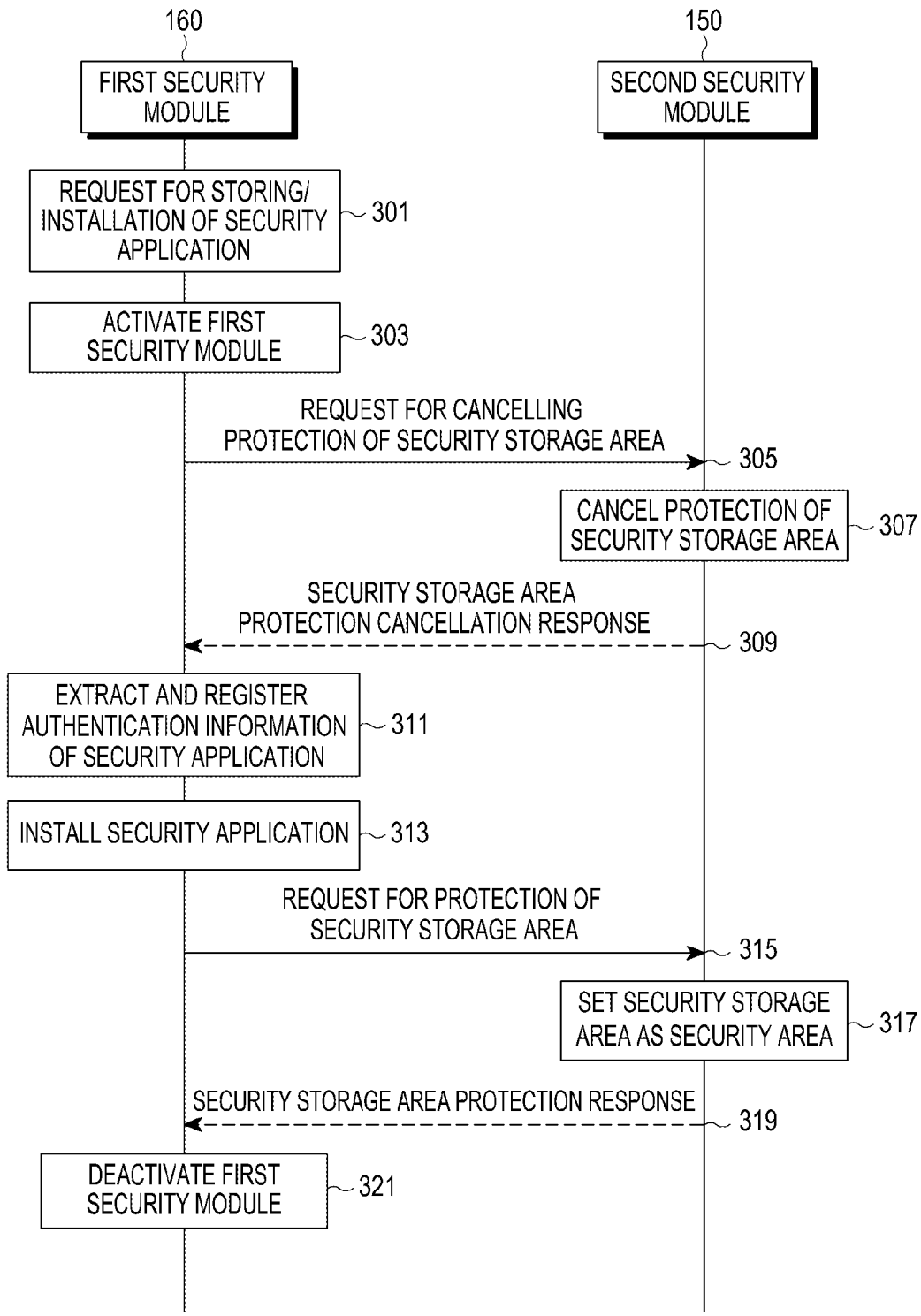
FIG. 4 is a diagram showing a new application installation process according to an embodiment of the present disclosure.

FIG. 4 is a diagram showing a process of installing a new security application in accordance with an embodiment of the present disclosure. In an embodiment of FIG. 4, the first security module 160 is assumed to be deactivated prior to receiving a request for storing and installing the new security application. Accordingly, the secure storage area 130 is set as a protection area by the second security module 150.

When a new application is downloaded, the general module 170 may check whether the new application is a security application or a non-security application. When the new application is the non-security application, the general module 170 may store and install the non-security application in the non-secure storage area 130. When the new application is the security application, in step 301 of FIG. 4, the general module 170 may request the first security module 160 to store and install the new application. At this time, if the first security module 160 is in a deactivated state, the first security module 160 is activated in step 303 and may request the second security module 150 for cancelling the protection of the secure storage area in step 305.

The second security module 150, according to the request in step 305, cancels (releases) the configuration of the protection area for the secure storage area in step 307. In addition, the second security module 150 transmits a secure area protection cancellation response to the first security module 160.

The first security module 160 extracts authentication information on the new security application in step 311. The authentication information may include, for example, the developer identification information of security applications, security application identification information, an electronic signature, version information, and the like. The first security module 160 may store the extracted authentication information in the security application list of the secure storage area 130, and register a new application to the security application list.

Then, the first security module 160 may store and install a new security application in the secure storage area 130 in step 313. When the installation of the new security application has been completed, and there is no further security process execution request, the first security module 160 requests the second security module 150 for the protection area configuration for the secure storage area 130 in step 315.

According to the request of step 315, the second security module 150 configures the secure storage area 130 as a protection area, and transmits a security storage area protection response to the first security module 160 in step 319.

The first security module 160 is deactivated in step 321.

Accordingly, even when the first security module 160 is deactivated, the secure storage area 130 may be protected by the second security module 150, and may prevent an access by the general module 170.

Figure 5:
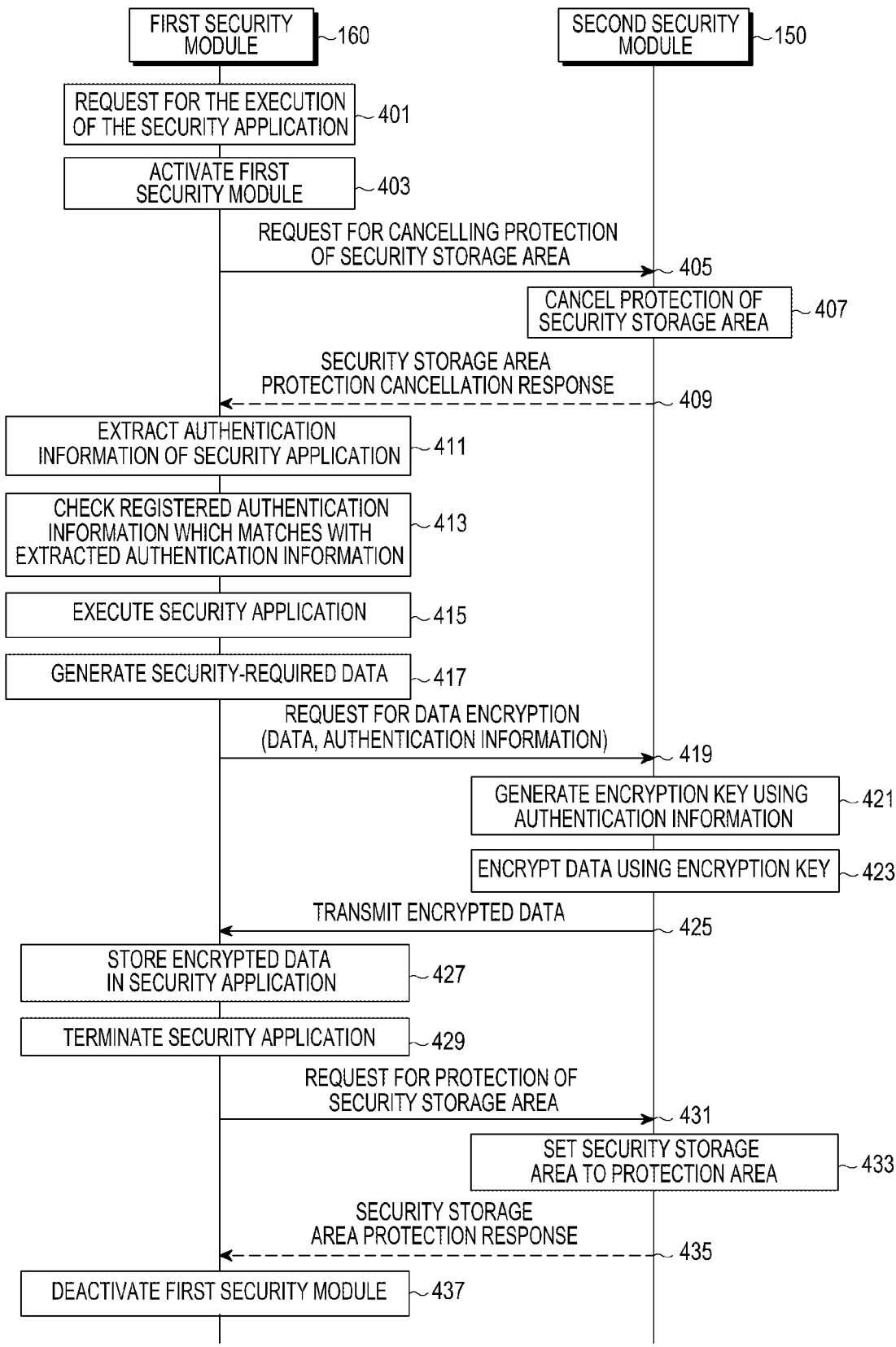
FIG. 5 is a diagram showing a process of storing data that is generated according to the execution of a security application according to an embodiment of the present disclosure.

FIG. 5 is a diagram showing a process of executing a security application in accordance with an embodiment of the present disclosure. In an embodiment of FIG. 5, the first security module 160 is assumed to be deactivated prior to receiving a request for executing a security application. Accordingly, the secure storage area 130 is set as a protection area by the second security module 150.

When there is a request for the execution of the security application, the general module 170 may request the first security module 160 to execute the application in step 401 of FIG. 5. At this time, when the first security module 160 is in a deactivated state, the first security module 160 is activated in step 403, and may request the second security module 150 to cancel the secure storage area protection in step 405.

The second security module 150, according to the request in step 405, cancels the configuration of the protection area for the secure storage area in step 407. In addition, the second security module 150 transmits a secure area protection cancellation response to the first security module 160 in step 409.

The first security module 160 extracts authentication information on a security application for which the execution is requested in step 411. The authentication information may include, for example, the developer identification information of security applications, security application identification information, a digital signature, version information, and the like. In step 413, the first security module 160 compares the extracted authentication information with the authentication information registered in the security application list of the secure storage area 130, and when there are authentication information that matches with each other, executes the security application in the secure storage area 130, in step 415.

As shown in step 417, in a process of executing the security application, when security required data is generated, the first security module 160 transmits the data encryption request to the second security module 150 in step 419. At this time, the secure channel is formed between the second security module 150 and the first security module 160. The data encryption request may include data to be encrypted and authentication information. The authentication information may include developer identification information of the security application and application identification information.

The second security module 150 may generate the encryption key using the authentication information included in the data encryption request in step 421, and encrypts the data included in the data encryption request in step 423. In addition, the second security module 150 transmits the encrypted data to the first security module 160 in step 425. The encrypted data is also transmitted through the secure channel.

The first security module 160 may store the encrypted data in the security application so as to strengthen the protection for the security application in step 427.

Then, when identifying the termination of the security application in step 429, the first security module 160 requests the second security module 150 to configure a protection area on the secure storage area 130 in step 431.

According to the request of step 431, the second security module 150 configures the secure storage area 130 as a protection area in step 433, and transmits a security storage area protection response to the first security module 160 in step 435.

The first security module 160 is deactivated in step 437.

Figure 6:
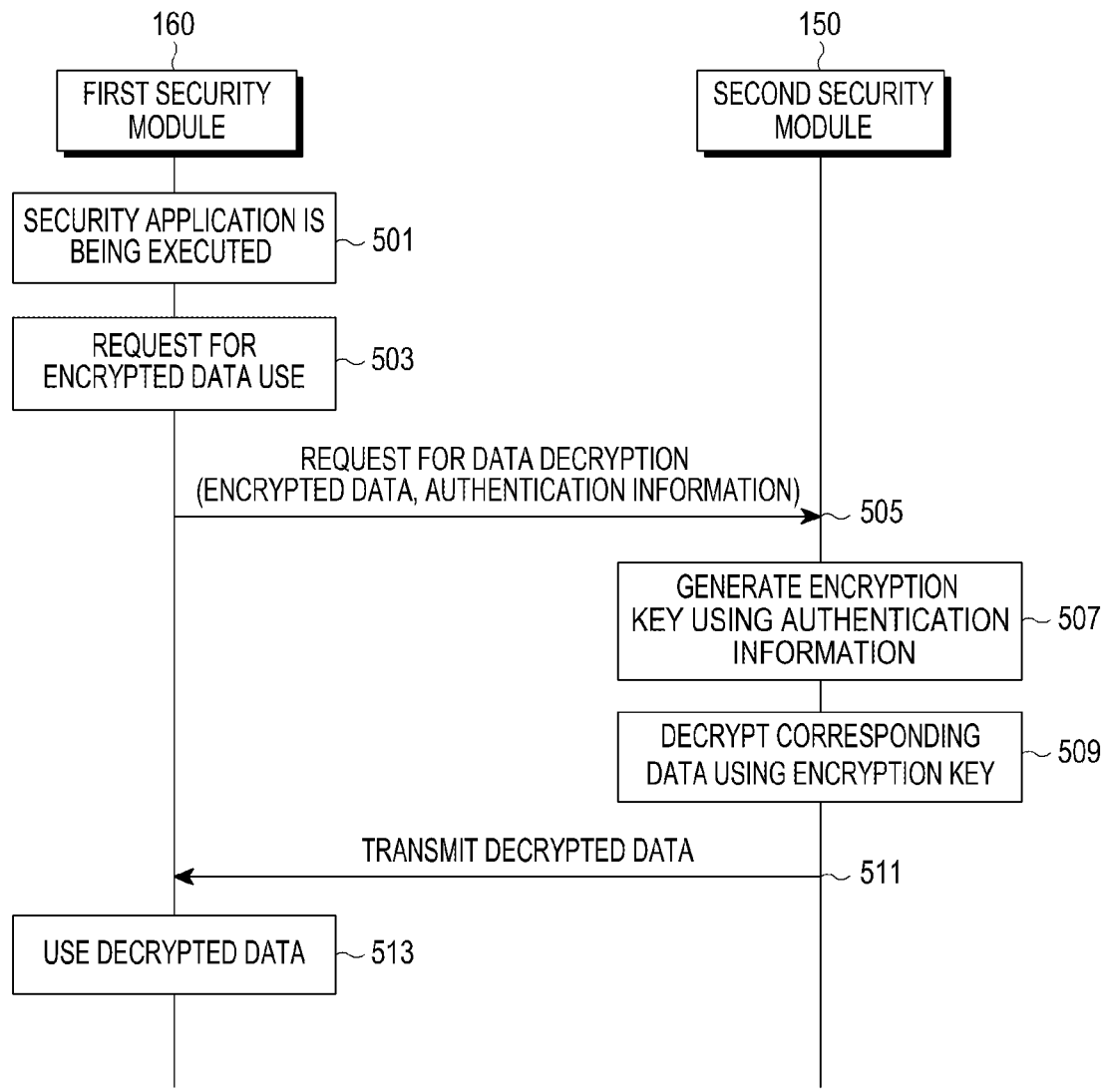
FIG. 6 is a diagram showing a process of using data stored in a security application according to an embodiment of the present disclosure.

FIG. 6 is a diagram illustrating an operation process in a case where encrypted data is used in a process of executing a security application according to an embodiment of the present disclosure. In an embodiment of FIG. 6, it is assumed that the security application is being executed by the first security module 160.

As shown in step 501, during the execution of the security application, a request for using the encrypted data is generated in step 503, and then the first security module 160 transmits the data decryption request to the second security module 150 in step 505. At this time, a secure channel is formed between the second security module 150 and the first security module 160. The data decryption request may include the encrypted data and authentication information. The authentication information may include developer identification information of the security application and application identification information.

The second security module 150 may generate an encryption key using the authentication information included in the data decryption request in step 507, and decrypts the data included in the data decryption request using the encryption key in step 509. In addition, the second security module 150 transmits the decrypted data to the first security module 160 in step 511. The decrypted data is also transmitted through the secure channel.

The first security module 160 may use the decrypted data in step 513.

As described above, the present disclosure may protect a secure content twice using the second security module 150 and the first security module 160 so as to strengthen the security of the secure content.

Figure 7:
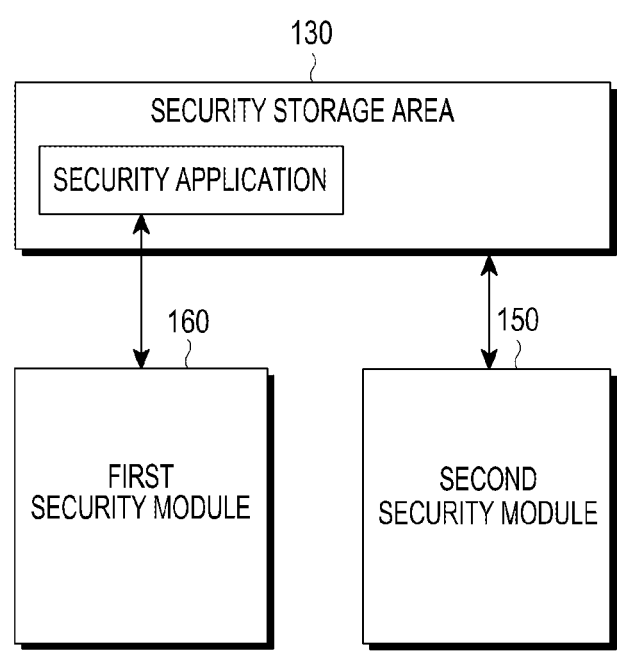
FIG. 7 is a diagram showing an execution state of a security application according to an embodiment of the present disclosure.

A state where the security application is executed as shown in FIGS. 5 and 6 is shown in FIG. 7. FIG. 7 is a diagram showing a state where the security application is executed in the secure storage area 130 by the first security module 160.

In the embodiment of the FIGS. 5 and 6, in order to encrypt data generated in the execution process of the security application to store the encrypted data, or in order to decrypt the encrypted data, the first security module 160 transmits the data (or the encrypted data) along with authentication information to the second security module 150. However, in accordance with another embodiment of the present disclosure, it may be configured to transmit, by the second security module 150, an encryption key generated using the authentication information to the first security module 160, and to store the encryption key by the first security module 160. In this case, the first security module 160 may be configured to include a secure storage area capable of storing the encryption key.

That is, when authentication of the security application in step 413 of FIG. 5 is completed, the first security module 160 may transmit, to the second security module 150, an encryption key generation request including authentication information (e.g., identification information of the security application, developer identification information) through a secure channel. Accordingly, the second security module 150 generates an encryption key using the authentication information received from the first security module 150, and transmits the encryption key to the first security module 160 through the secure channel. The first security module 160 stores the encryption key in the secure storage area 130 and then executes the security application in the secure storage area 130. In addition, when security required data is generated during in a process of executing the security application, the first security module 160 encrypts the data using the encryption key and then stores the encrypted data in the security application. The first security module 160 may also perform a decryption of the encrypted data by using the encryption key stored in the secure storage area.

As another example, it may be configured to transmit the encryption key along with the encrypted data, by the second security module 150, to the first security module 160 in step 425. The first security module 160 may encrypt data using the encryption key when security required data is further generated after storing the encryption key in the secure storage area. In addition, the first security module 160 may also perform a decryption of the encrypted data by using the encryption key stored in the secure storage area.

Figure 8:
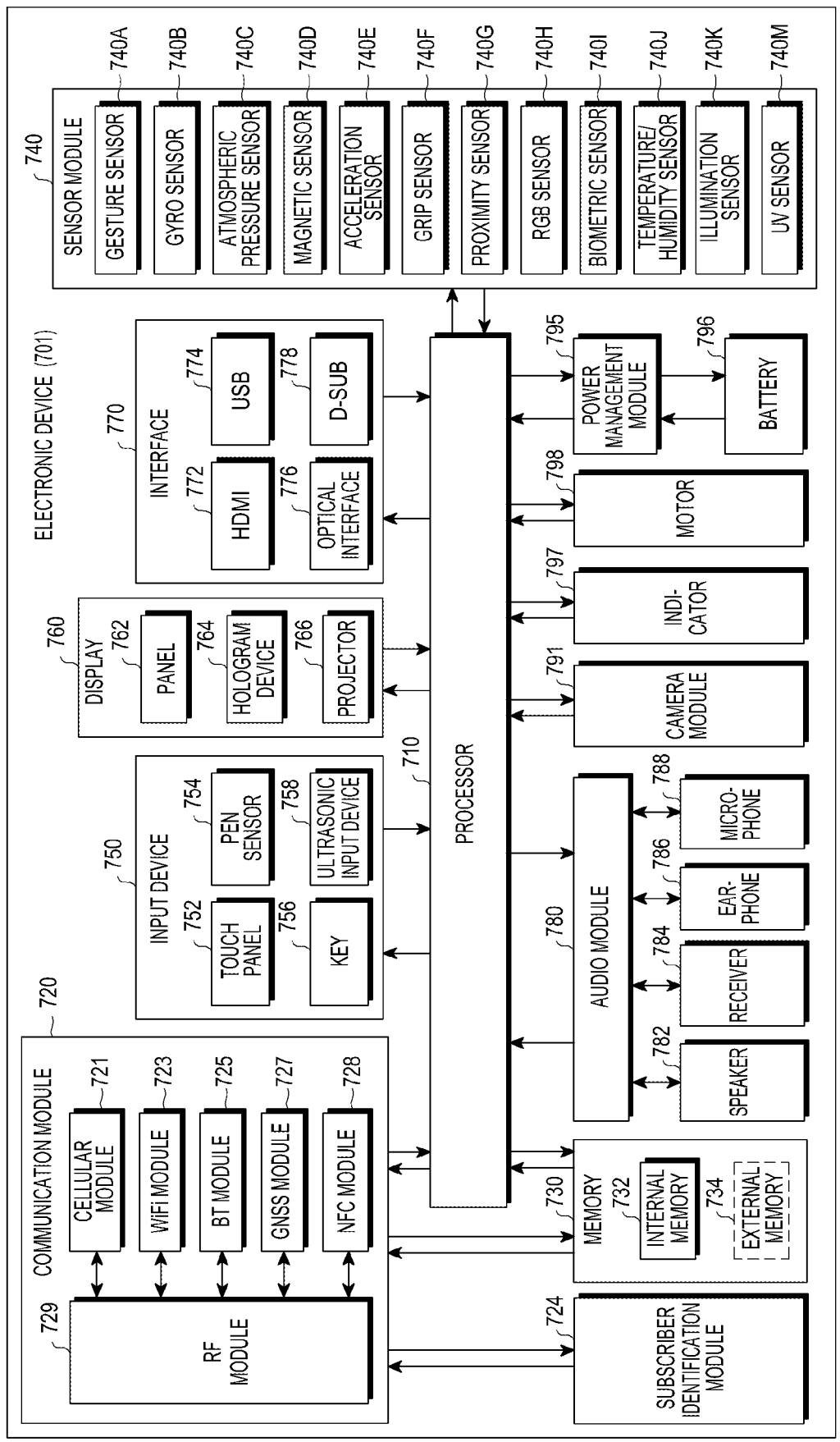
FIG. 8 is a diagram showing a configuration of a mobile device according to an embodiment of the present disclosure.

FIG. 8 is a block diagram of an electronic device 700 according to various embodiments of the present disclosure. For example, the electronic device 700 may include the whole or part of the electronic device 100 illustrated in FIG. 1. In particular, a controller 710 and a memory 730 of the electronic device 700 may be similarly implemented with the controller 140 and the memory 110 of the electronic device 100 shown in FIG. 1. The electronic device 700 may include a controller 710 including at least one Application Processor (AP), a communication module 720, a Subscriber Identification Module (SIM) card 724, a memory 730, a sensor module 740, an input device 750, a display 760, an interface 770, an audio module 780, a camera module 791, a power management module 795, a battery 796, an indicator 797, and a motor 798.

The controller 710 may control multiple hardware or software elements connected to the controller 710 by running, for example, an Operation System (OS) or an application program, and may perform processing of and arithmetic operations on various data. The controller 710 may be implemented by, for example, a System on Chip (SoC). According to an embodiment, the controller 710 may further include a Graphic Processing Unit (GPU) and/or an image signal processor. The controller 710 may include at least some (e.g., a cellular module 721) of the elements illustrated in FIG. 2. The controller 710 may load, into a volatile memory, instructions or data received from at least one (e.g., a non-volatile memory) of the other elements and may process the loaded instructions or data, and may store various data in a non-volatile memory.

The communication module 720 may have a configuration equal or similar to that of the communication interface 180 of FIG. 1. The communication module 720 may include, for example, a cellular module 721, a Wi-Fi module 723, a BT module 725, a GNSS module 727 (for example, a GPS module, a Glonass module, a Beidou module, or a Galileo module), an NFC module 728, and a Radio Frequency (RF) module 729.

The cellular module 721 may provide a voice call, an image call, a text message service, or an Internet service through, for example, a communication network. According to an embodiment, the cellular module 721 may distinguish and authenticate electronic devices 700 within a communication network using a subscriber identification module (for example, the SIM card 724). According to an exemplary embodiment of the present disclosure, the cellular module 721 may perform at least some of the functions that the controller 710 may provide. According to an exemplary embodiment, the cellular module 721 may include a Communication Processor (CP).

Each of the Wi-Fi module 723, the BT module 725, the GNSS module 727, and the NFC module 728 may include, for example, a processor for processing data transmitted and received through the relevant module. According to some embodiments of the present disclosure, at least some (e.g., two or more) of the cellular module 721, the Wi-Fi module 723, the BT module 725, the GNSS module 727, and the NFC module 728 may be included in one Integrated Chip (IC) or IC package.

The RF module 729 may transmit/receive, for example, a communication signal (for example, an RF signal). The RF module 729 may include, for example, a transceiver, a Power Amp Module (PAM), a frequency filter, a Low Noise Amplifier (LNA), or an antenna. According to another embodiment of the present disclosure, at least one of the cellular module 721, the Wi-Fi module 723, the BT module 725, the GNSS module 727, and the NFC module 728 may transmit and receive RF signals through a separate RF module.

The subscriber identification module 724 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The internal memory 730 (for example, a memory 140) may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash or a NOR flash, etc.), a hard disk drive, or a Solid State Drive (SSD).

An external memory may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory can be functionally and/or physically connected to the electronic device 700 via various interfaces.

The sensor module 740 may measure a physical quantity or detect an operation state of the electronic device 700, and may convert the measured or detected information into an electrical signal. The sensor module 740 may include, for example, at least one of a gesture sensor 740A, a gyro sensor 740B, an atmospheric pressure sensor 740C, a magnetic sensor 740D, an acceleration sensor 740E, a grip sensor 740F, a proximity sensor 740G a color sensor 740H (for example, a red, green, blue (RGB) sensor), a biometric sensor 740I, a temperature/humidity sensor 740J, a light sensor 740K, and a ultraviolet (UV) sensor 740M. Additionally or alternatively, the sensor module 740 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 740 may further include a control circuit for controlling one or more sensors included therein. In some exemplary embodiments of the present disclosure, an electronic device 700 may further include a controller configured to control the sensor module 740 as a part of or separately from the controller 710, and may control the sensor module 740 while the controller 710 is in a sleep state.

The input device 750 may include, for example, a touch panel 752, a (digital) pen sensor 754, a key 756, or an ultrasonic input device 758. The touch panel 752 may use at least one of, for example, a capacitive type, a resistive type, an infrared type, and an ultrasonic type. Also, the touch panel 752 may further include a control circuit. The touch panel 752 may further include a tactile layer and provide a tactile reaction to the user.

The (digital) pen sensor 754 may include, for example, a recognition sheet which is a part of the touch panel or is separated from the touch panel. The key 756 may include, for example, a physical button, an optical key or a keypad. The ultrasonic input device 758 may detect ultrasonic waves generated by an input tool through a microphone (for example, a microphone 788) and identify data corresponding to the detected ultrasonic waves.

The display 760 (for example, the display 190) may include a panel 762, a hologram device 764 or a projector 766. The panel 762 may include a configuration identical or similar to that of the display 160 illustrated in FIG. 1. The panel 762 may be implemented to be, for example, flexible, transparent, or wearable. The panel 762 and the touch panel 752 may be implemented as one module. The hologram 764 may show a three dimensional image in the air by using an interference of light. The projector 766 may display an image by projecting light onto a screen. The screen may be located, for example, inside or outside the electronic device 700. According to an exemplary embodiment, the display 760 may further include a control circuit for controlling the panel 762, the hologram device 764, or the projector 766.

The interface 770 may include, for example, a High-Definition Multimedia Interface (HDMI) 772, a Universal Serial Bus (USB) 774, an optical interface 776, or a D-sub-miniature (D-sub) 778. The interface 770 may be included in, for example, the communication interface 180 illustrated in FIG. 1. Additionally or alternatively, the interface 770 may include, for example, a Mobile High-definition Link (MHL) interface, a Secure Digital (SD) card/Multi-Media Card (MMC) interface, or an Infrared Data Association (IrDA) standard interface.

The audio module 780 may bilaterally convert, for example, a sound and an electrical signal. At least some elements of the audio module 780 may be included in, for example, the input/output interface 145 illustrated in FIG. 1. The audio module 780 may process sound information which is input or output through, for example, a speaker 782, a receiver 784, earphones 786, the microphone 788 or the like.

The camera module 791 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 795 may manage, for example, power of the electronic device 700. According to an embodiment, the power management module 795 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 796, and a voltage, a current, or a temperature during the charging. The battery 796 may include, for example, a rechargeable battery or a solar battery.

The indicator 797 may display a particular state (e.g., a booting state, a message state, a charging state, or the like) of the electronic device 700 or a part (e.g., the processor 710) of the electronic device 700. The motor 798 may convert an electrical signal into mechanical vibration, and may generate vibration, a haptic effect, or the like. Although not illustrated, the electronic device 700 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. A method for protecting an application of an electronic device, comprising:
   executing, by a first security module, a security application in a security storage area of a memory of the electronic device;
   based on security-required data being generated according to the security application, transmitting, by the first security module, a request for encrypting the security-required data to a second security module;
   generating, by the second security module, an encryption key using authentication information included in the request for encrypting the security-required data, and encrypting the security-required data included in the request for encrypting the security-required data using the encryption key;
   transferring, by the second security module, the encrypted security-required data to the first security module; and
   storing, by the first security module, the encrypted security-required data in the security application.

2. The method of claim 1, further comprising:
based on identifying that the security application is completed, requesting, by the first security module, the second security module to protect the security storage area;
configuring, by the second security module, the security storage area as a protection area; and
turning off the first security module,
wherein a first secure operating system is executed on the first security module, a second secure operating system is executed on the second security module, and an access to the security storage area is not allowed for a general module on which a general operating system is executed.

3. The method of claim 2, further comprising:
in a state in which the first security module is turned off, when an execution of the secure application is requested, turning on the first security module;
requesting, by the first security module, the second security module to cancel the configuring of the security storage area as the protection area;
cancelling, by the second security module, the configuring of the security storage area as the protection area; and
authenticating, by the first security module, the security application and executing the security application in the security storage area.

4. The method of claim 3, wherein the authenticating of the security application by the first security module comprises:
comparing authentication information on the security application and authentication information registered in a security application list stored in the security storage area.

5. The method of claim 4, wherein a power source of the electronic device is turned on, the first security module is booted, and
wherein the method further comprises:
checking, by the first security module, an integrity of the second secure operating system of the second security module, and
transmitting, by the first security module, a booting command to the second security module.

6. The method of claim 5, wherein, in a process of booting the first security module and the second security module, a secure channel encryption key for forming a secure channel is shared between the first security module and the second security module.

7. The method of claim 6, wherein the second security module comprises a security storage unit configured to store an algorithm used for generating the secure channel encryption key, and an algorithm used for generating the encryption key for encrypting the security-required data.

8. An electronic device comprising:
a memory; and
a controller,
wherein the controller comprises:
a first security module configured to:
executes a security application in a security storage of the memory, and
based on security-required data being generated according to the security application, transmit a request for encrypting the security required data to a second security module; and
the second security module configured to:
generate an encryption key using authentication information included in the request for encrypting the security-required data,
encrypt the security-required data included in the request for encrypting the security-required data using the encryption key, and
transfer the encrypted security-required data to the first security module,
wherein the first security module is further configured to stores the encrypted security-required data in the security application.

9. The electronic device of claim 8,
wherein the first security module is further configured to:
based on identifying that the security application is completed, requests the second security module to protect the security storage area, and
turn-off the first security module,
and
wherein the second security module is further configured to configure the security storage area as a protection area in response to the requesting of protecting the security storage area by the first security module, and
wherein a first secure operating system is executed on the first security module, a second secure operating system is executed on the second security module, and an access to the security storage area is not allowed for a general module on which a general operating system is executed.

10. The electronic device of claim 9,
wherein, in a state in which the first security module is turned off, when an execution of the secure application is requested, the first security module is turned on,
wherein the first security module is further configured to:
request the second security module to cancel the configuring of the security storage area as the protection area, and
authenticate the security application, and
execute the security application in the security storage area,
wherein the second security module is further configured to cancel the configuring of the security storage area as the protection area in response to the requesting of cancelling the configuring of the security storage area as the protection area by the first security module.

11. The electronic device of claim 10, wherein the first security module is configured to compares authentication information on the security application and authentication information registered in a security application list stored in the security storage area so as to authenticate the security application.

12. The electronic device of claim 11, wherein a power source of the electronic device is turned on, the first security module is booted, and
wherein the first security module is further configured to check an integrity of the second secure operating system of the second security module, and transmits a booting command to the second security module.

13. The electronic device of claim 12, wherein, in a process of booting the first security module and the second security module, a secure channel encryption key for forming a secure channel is shared between the first security module and the second security module.

14. The electronic device of claim 13, wherein the second security module comprises a security storage unit configured to store an algorithm used for generating the secure channel encryption key, and an algorithm used for generating the encryption key for encrypting the security-required data.

* * * * *